United States Patent [19]

Sano et al.

[11] Patent Number: 5,194,053
[45] Date of Patent: Mar. 16, 1993

[54] ROTATIONAL SPEED DIFFERENTIAL RESPONSIVE TYPE CONTROL COUPLING WITH VARIABLE TRANSFER TORQUE CONTROL MEANS

[75] Inventors: Akihiko Sano; Yasuhiro Niikura; Tokiyoshi Yanai, all of Kanagawa, Japan

[73] Assignee: Nissan Motor Co., Ltd., Yokohama, Japan

[21] Appl. No.: 719,704

[22] Filed: Jun. 27, 1991

[30] Foreign Application Priority Data

Jun. 29, 1990 [JP] Japan .................................. 2-173490

[51] Int. Cl.$^5$ .......................... F16H 1/44; F16H 1/455; F16D 31/02
[52] U.S. Cl. ...................................... 475/89; 192/60; 192/103 F; 475/88; 475/94; 475/106; 475/231
[58] Field of Search ........................ 475/84, 86, 88, 89, 475/90, 91, 102, 104, 106, 94, 254, 257, 231; 192/60, 103 R, 103 F

[56] References Cited

U.S. PATENT DOCUMENTS

| | | | |
|---|---|---|---|
| 2,207,310 | 7/1940 | Ballamy | 475/89 |
| 3,229,794 | 1/1966 | Fraser | 192/60 |
| 4,181,203 | 1/1980 | Malloy | 192/103 F X |
| 4,549,448 | 10/1985 | Kittle | 475/86 X |
| 4,727,966 | 3/1988 | Hiramatsu et al. | 192/103 F X |
| 4,757,886 | 7/1988 | Brown et al. | 192/103 F X |
| 4,785,923 | 11/1988 | Ushijima | 192/103 F X |
| 4,790,404 | 12/1988 | Naito | 475/86 X |
| 4,973,294 | 11/1990 | Kobari et al. | 475/84 X |
| 5,024,309 | 6/1991 | Takemura et al. | 192/60 |
| 5,106,347 | 4/1992 | Takemura et al. | 475/90 |
| 5,137,130 | 8/1992 | Niikura et al. | 475/89 X |

FOREIGN PATENT DOCUMENTS

| | | |
|---|---|---|
| 0278588 | 8/1988 | European Pat. Off. . |
| 0398124 | 11/1990 | European Pat. Off. . |
| 63-101567 | 5/1988 | Japan . |

Primary Examiner—Leslie A. Braun
Assistant Examiner—David E. Henn
Attorney, Agent, or Firm—Lowe, Price, Leblanc & Becker

[57] ABSTRACT

A transfer torque control device for a rotational speed responsive type control coupling is provided for providing a desired variation of a transfer torque in response to a variation of a rotational speed differential. The control coupling has orifices for restricting fluid flow therethrough and for thereby producing a transfer torque between first and second axle shafts. The transfer torque control device controls the orifices in such a manner that the openings of the orifices are varied successively in response to variations of the rotational speed differential to obtain the desired torque transfer characteristic.

5 Claims, 8 Drawing Sheets

| θ | 6.0 | 6.1 | 6.2 | 6.3 | 6.4 |
|---|---|---|---|---|---|
| k | 180 | 200 | 230 | 250 | 280 |
| θ | 6.5 | 6.6 | 6.7 | 6.8 | 6.9 |
| k | 310 | 350 | 390 | 420 | 460 |
| θ | 7.0 | 7.1 | 7.2 | 7.3 | 7.4 |
| k | 550 | 600 | 700 | 900 | 1000 |
| θ | 7.5 | 7.6 | 7.7 | 7.8 | 7.9 |
| k | 1100 | 1276 | 1500 | 2000 | 3000 |

ROTATIONAL SPEED DIFFERENTIAL RESPONSIVE TYPE CONTROL COUPLING WITH VARIABLE TRANSFER TORQUE CONTROL MEANS

BACKGROUND OF THE INVENTION

1. Field of the Invention

The present invention relates to a rotational speed differential responsive type control coupling, particularly of the kind having a variable transfer torque control means, i.e., a means for variably controlling a transfer torque for a given rotational speed differential.

2. Description of the Prior Art

A rotational speed differential responsive type control coupling of the above described kind is known as disclosed in Japanese Patent Provisional Publication No. 63-101567. The control coupling is also called an orifice coupling and adapted to vary a torque transfer characteristic through variable control of an orifice opening.

The prior art control coupling has various preset torque transfer characteristics, for example, as shown in FIG. 10, characteristic "A", characteristic "B" and characteristic "C" and is adapted to select one of the characteristics in accordance with the processing shown in the flowchart of FIG. 11.

However, with such a control coupling, only a simple variation of torque transfer characteristic is obtained, that is, a transfer torque for a given rotational speed differential is simply determined depending upon the selected torque transfer characteristic. Accordingly, it is impossible, for example, to keep a transfer torque unchanged irrespective of a variation of a rotational speed differential or to keep a rotational speed differential unchanged by increasing or reducing a transfer torque, i.e., to control a transfer torque independently from a rotational speed differential.

For example, when the prior art control coupling is used as a differential slip limiting device for a limited slip differential for a rear-wheel drive vehicle and operated to select, for example, the characteristic "A" in FIG. 10, the transfer torque T increases sharply with an increase of the rotational speed differential $\Delta N$ within a range smaller than a predetermined value. This makes it possible to attain a differential slip limitation which causes the vehicle to turn with a good responsiveness. However, when the rotational speed differential $\Delta N$ increases further, the transfer torque T is increased further to possibly cause the vehicle to lose traction suddenly and unexpectedly.

On the other hand, when the control coupling is operated to select the characteristic "C" in FIG. 10, an effective differential slip limitation cannot be attained until the rotational speed differential $\Delta N$ increases up to a certain large value, thus causing the limited slip differential to have poor responsiveness.

For the foregoing reason, the prior art control coupling has actually been used in such a way as to normally select the characteristic "B" so that, though the responsiveness is not so good, too sharp an increase of transfer torque does not occur and to select, when a rotational speed differential $\Delta N$ increases beyond a predetermined large value, the characteristic "C" so that the above described possible spining can be prevented.

SUMMARY OF THE INVENTION

In accordance with the present invention, there is provided a control coupling which comprises a first rotary member, a second rotary member rotatable relative to the first rotary member, and a hydraulic fluid discharge means responsive to a rotational speed differential between the first and second rotary members for discharging a quantity of hydraulic fluid proportional to the rotational speed differential. An orifice means is provided for restricting discharge of hydraulic fluid by the hydraulic fluid discharge means and thereby producing a transfer torque between the first and second rotary members, as well as orifice opening changing means for changing an orifice opening of the orifice means when actuated, and an actuator means for actuating the orifice opening changing means. Target transfer torque setting means are included for setting a target transfer torque to be transmitted between the first and second rotary members, with rotational speed differential detecting means for detecting a rotational speed differential between the first and second rotary members. Also included is an actual orifice opening coefficient operating means for performing arithmetic operations on an actual orifice opening coefficient by dividing the target orifice opening by the square of a rotational speed differential detected by the rotational speed differential detecting means, with map means for looking up an orifice opening corresponding to its own orifice opening coefficient, target orifice opening determining means for determining a target orifice opening on the basis of the actual orifice opening coefficient obtained by the arithmetic operations by the actual orifice opening coefficient operating means and the map means, and output means for producing a control signal capable of attaining the target orifice opening to the actuator means.

This control coupling is effective for overcoming the above noted problems inherent in the prior art device.

It is accordingly an object of the present invention to provide a novel and improved rotational speed differential responsive type control coupling which can variably control a transfer torque independently from a variation of a rotational speed differential.

It is a further object of the present invention to provide a novel and improved rotational speed differential responsive type control coupling of the above described character which can attain both a good turning ability and stability when used as a differential slip limiting device for a limited slip differential for a rear-wheel drive vehicle.

It is a further object of the present invention to provide a novel and improved rotational speed differential responsive type control coupling which can attain such a torque transfer characteristic in which a transfer torque increases sharply in response to a variation of a rotational speed differential within a range smaller than a predetermined value and is maintained at a constant value irrespective of a variation of a rotational speed differential within a range larger than a predetermined value.

DETAILED DESCRIPTION OF PREFERRED EMBODIMENTS

Figure 1:
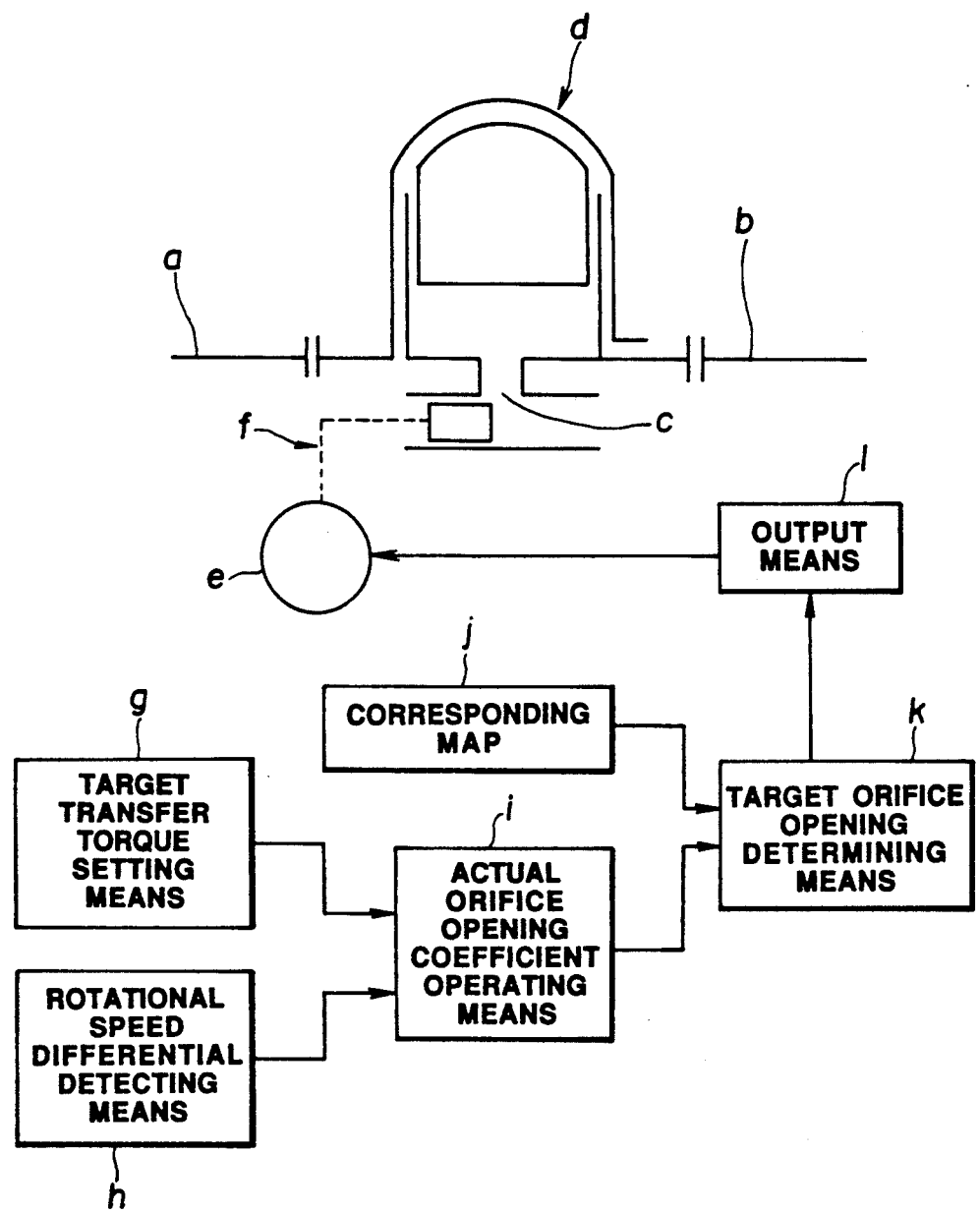
FIG. 1 is a diagrammatic view of a transfer torque control device for a rotational speed differential responsive type control coupling according to a preferred embodiment of the present invention.
Figure 2:
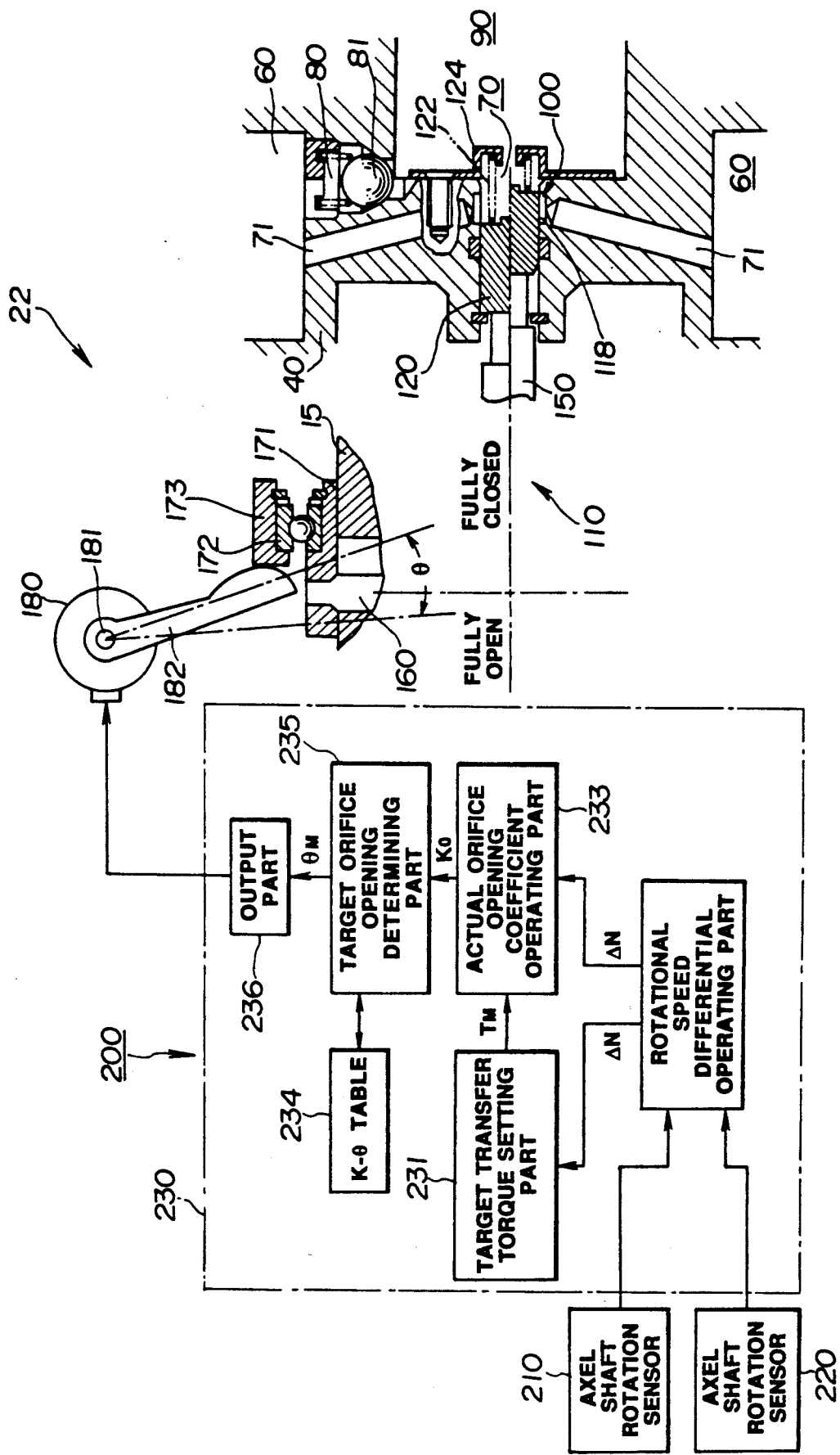
FIG. 2 is a diagrammatic view of a transfer torque control device according to another embodiment of the present invention, together with a portion of a rotational speed differential responsive type control coupling.

Referring first to FIG. 1, a brief description of the invention is provided below. A rotational speed differential responsive type control coupling is designated by "d" and interposed between coaxially aligned first and second rotary members "a" and "b" and drivingly connected to same. The control coupling "d" includes an orifice "c" for restricting flow of hydraulic fluid therethrough and thereby producing a transfer torque between the first and second rotary members "a" and "b" in response to a rotational speed differential between the rotary members.

A transfer torque control device for the control coupling "d" includes an orifice opening changing means "f" for changing the opening of the orifice "c" and thereby changing a torque transfer characteristic by supplying a control signal to an actuator "e". It also includes a target transfer torque setting means "g", a rotational speed differential detecting means "h" for detecting a rotational speed differential between the first and second rotary members "a" and "b", an actual orifice opening coefficient operating means "i" for performing arithmetic operations on an actual orifice opening coefficient by dividing the above described target transfer torque by the square of a detected rotational speed differential, a corresponding map "j" for looking up an orifice opening corresponding to its own orifice opening coefficient, a target orifice opening determining means "k" for determining a target orifice opening from the actual orifice opening coefficient obtained by the arithmetic operations by the actual orifice opening coefficient operating means "i" and the corresponding map "j", and an output means "l" for supplying a signal capable of attaining the above described target orifice opening to the actuator "e".

In operation, the target transfer torque setting means "g" sets a target transfer torque to be transferred between the rotary members "a" and "b". The rotational speed differential detecting means "h" detects a rotational speed differential between the first and second rotary members "a" and "b".

The actual orifice opening coefficient operating means "i" performs arithmetic operations on an actual orifice opening coefficient by dividing the above set target transfer torque by the square of the detected rotational speed differential. Then, the target orifice opening determining means "k" determines a target orifice opening on the basis of the actual orifice opening coefficient obtained by the arithmetic operations by the actual orifice opening coefficient operating means "i" and the corresponding map "j". The output means "l" supplies a signal capable of attaining the target orifice opening to the actuator "e".

By the operation of the actuator "e" in response to the signal supplied thereto from the output means "l", the orifice opening changing means "f" changes the orifice opening and thereby changing the torque transfer characteristic. By this action, the rotational speed differential responsive type control coupling "d" produces a transfer torque coincident with the target transfer torque by the effect of the rotational speed differential between the first and second rotary members "a" and "b" and the flow restriction by the orifice "c".

A transfer torque to be transferred through the coupling "d" is thus controlled by the target transfer torque set at the target transfer torque setting means "g". The target transfer torque can be set freely and therefore a target torque transfer characteristic can be set freely and not subjected to any restrictions.

Referring now through FIGS. 3 to 9, a more detailed description of the invention follows.

A preferred embodiment of rotational speed differential responsive type control coupling is generally indicated by 20 and by way of example incorporated in a limited slip rear differential 1 for a rear-wheel drive vehicle to serve as a differential slip limiting device.

Figure 3:
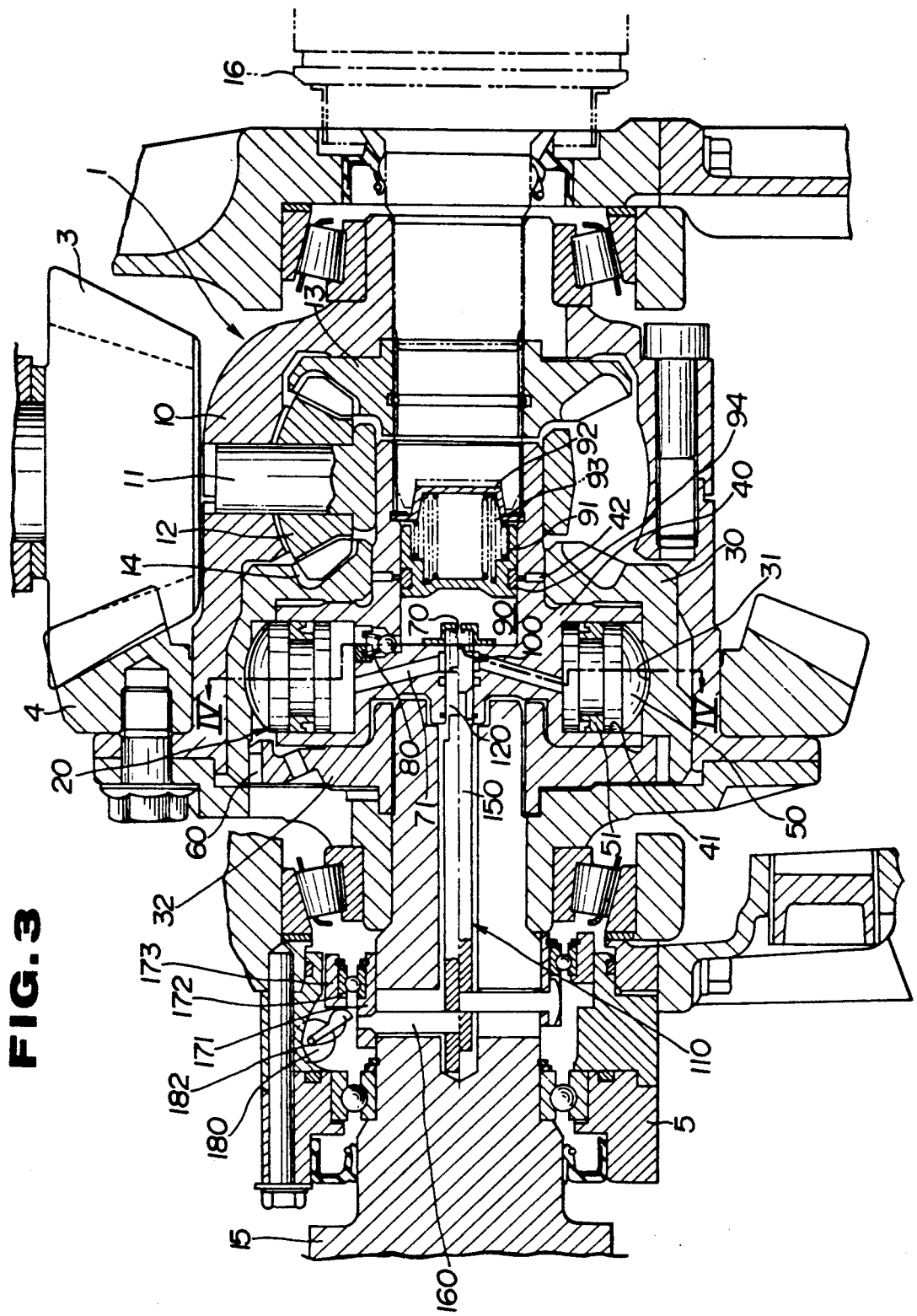
FIG. 3 is a sectional view of a limited slip rear differential in which the rotational speed differential responsive type control coupling of FIG. 2 is incorporated to serve as a differential slip limiting device.
Figure 4:
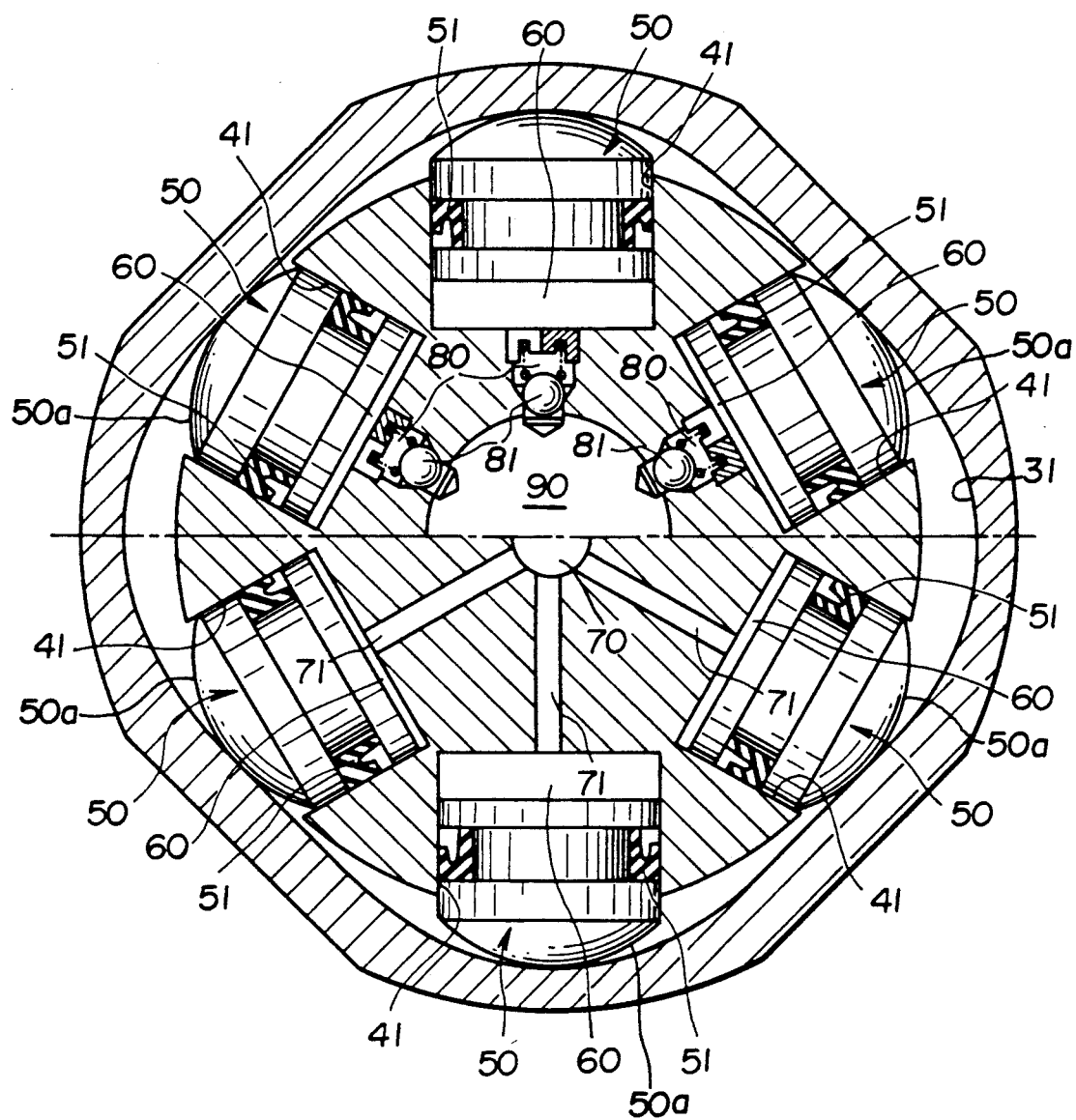
FIG. 4 is a sectional view taken along the line IV—IV of FIG. 3.

As shown in FIG. 3, the rear differential 1 includes a driving member in the form of a differential casing 10 which is rotatable about an axis, and two driven members in the form of axle shafts 15 and 16 extending in the opposite outward directions from the casing 10 generally along the axis which the casing 10 is rotatable about. An input gear 3 meshes with a ring gear 4 which is bolted to the casing 10. A pinion carrier 11 is mounted in the casing 10 for rotation therewith and rotatably carries a pinion 12. A pair of side gears 13 and 14 are drivingly connected to the axle shafts 15 and 16, respectively.

The rotational speed differential responsive type control coupling 20 is disposed between the axle shafts 15 and 16 to limit a rotational speed differential therebetween. The control coupling 20 comprises a first rotary element in the form of a cam ring 30 formed with a rise and fall cam surface 31. The cam ring 30 is splined to a hub 32 which is in turn splined to the axle shaft 15. Surrounded by the cam ring 30 is a second rotary element in the form of a rotor 40. The rotor 40 is drivingly connected to the axle shaft 16 and therefore to the side gear 13 to rotate with them, i.e., the axle shaft 16 is splined to the side gear 13 and extends further inward of the casing 10 into a central opening of the carrier 11 and is splined to the rotor 40. By this, an input torque transmitted to the differential casing 10 via the input gear 3 and the ring gear 4 is transmitted on one hand to the axle shaft 16 via the pinion 12 and the side gear 13, and on the other hand to the axle shaft 15 via the pinion 12, side gear 14, cam ring 30 and splined hub 32.

When a rotational speed differential occurs between the axle shafts 15 and 16, a torque for limiting a differential slip, i.e., a transfer torque, is produced by a hydraulic fluid discharge means which will be described hereinbelow.

The hydraulic fluid discharge means includes the rise and fall cam surface 31, six cylinders 41 formed in the rotor 40 (see FIG. 4), and six pistons 50 positioned in the respective cylinders 41. Each piston 50 has a seal ring 51 to define a pressure chamber 60. More specifically, the cylinders 41 are defined in the form of radial holes having open radially outward ends where they face the cam surface 31. The pistons 50 have spherically rounded tops 50a where they are brought into contact with the cam surface 31.

The hydraulic fluid discharge means further includes a discharge passage means for discharging hydraulic fluid from the pressure chambers 60. As best seen from FIG. 4, the discharge passage means includes six radial discharge passages 71 formed in the rotor 40 to extend between the respective pressure chambers 60 and a spool chamber 70 for providing communication therebetween. The spool chamber 70 is in turn communicated with an accumulator chamber 90.

A restriction or orifice means 100 includes a plurality of orifices 118 at the junction between the discharge passages 71 and the spool chamber 70 for restricting fluid flow therethrough and thereby producing a transfer torque for limiting a differential slip in response to a rotational speed differential between the axle shafts 15 and 16.

Each pressure chamber 60 is communicated with a ball check valve 81 having a radial passage 80 extending between the respective pressure chambers 60 and the accumulator chamber 90 to provide communication therebetween. With these ball check valves 81, discharge of hydraulic fluid from the pressure chambers 60 is prevented although supply of hydraulic fluid thereto is allowed. The ball check valves 81 thus constitute a regulator passage means for regulating the pressure within the pressure chambers 60.

The accumulator chamber 90 and the spool chamber 70 are formed from a central or concentric opening of the rotor 40, which concentric opening has opposite axial ends sealingly closed by the valve spool 120 and an accumulator piston 91, respectively. The accumulator piston 91 is slidably installed in the accumulator chamber 90 and has a seal ring 92. The rotor 40 is formed with radial relief passages 42 which cooperate with the seal ring 94 to constitute a relief valve for maintaining the fluid pressure within the accumulator chamber 90 below a predetermined value. The accumulator piston 91 is biased toward the valve spool 120 by an accumulator spring 93 in the form of a dual spring assembly for thereby maintaining the fluid pressure within the accumulator chamber 90 above a predetermined value. The accumulator spring 93 is operatively disposed between the accumulator piston 91 and a spring retainer 92 fixed to the rotor 30.

The control coupling 20 is provided with a transfer torque control device 22 for controlling a torque transfer characteristic.

The transfer torque control device 22 includes an orifice opening changing means 110 for changing the opening of the orifice means 100 and thereby changing the torque transfer characteristic of the control coupling 20.

The orifice opening changing means 110 includes a valve spool 120 axially movably installed in the spool chamber 70 and cooperating with the orifices 118 to change the opening of the orifice means 100.

The orifice opening changing means 110 further includes an electrical type motor 180 installed in a differential housing 5 and having a motor shaft 181, a lever 182 secured at an end to the motor shaft 182 to turn about it, concentric inner and outer sleeves 171 and 173 axially movably installed on the axle shaft 15, a ball bearing 172 interposed between the inner and outer sleeves 171 and 173 to support them upon each other, the outer sleeve 173 being held in contact with a free end of the lever 182. A transversal rod 160 extends through and transversely of the axle shaft 15 to have opposite axial ends secured to the inner sleeve 171 and movable axially of the axle shaft 15 together with the inner sleeve 171. A push rod 150 is concentrically and axially movably installed in the axle shaft 15 and is secured to an axially central portion of the transversal rod 160 at an axial portion adjacent to an end, and the valve spool 120 is held in contact with the push rod 150 under the bias of a spring 122 interposed between the valve spool 120 and a retainer 124 secured to the rotor 40. By the spring 122, the valve spool 120 and the push rod 150 are urged together in a predetermined direction to cause the outer sleeve 173 held in contact with the lever 182. By this, the valve spool 120 is driven by the motor 180 to move axially relative to the rotor 40 for thereby changing the opening of the variable orifice means 100.

In this embodiment, a rotation angle $\theta$ of the motor 180 is used to designate a resulting opening of the variable orifice means 100.

The transfer torque control device 22 further includes a control circuit 200 for controlling the motor 180 in such a way as to enable the control coupling 20 to transmit a desired transfer torque independently from a given rotational speed differential between the axle shafts 15 and 16.

The control circuit 200 comprises a first axle shaft rotation sensor 210 for detecting rotation of the axle shaft 15 and producing a signal representative thereof, a second axle shaft rotation sensor 220 for detecting rotation of the axle shaft 16 and producing a signal representative thereof and a control unit 230 which serves as a processing unit. The control unit 230 receives signals from the sensors 220 and 230 and supplies a control signal to the motor 180.

The control unit 230 comprises a target transfer torque setting part 231 for setting a target transfer torque $T_M$ on the basis of a rotational speed differential $\Delta N$, a rotational speed differential operating part 232 for performing arithmetic operations on a rotational speed differential $\Delta N$ on the basis of the signals from the sensors 210 and 220, an actual orifice opening operating part 233 for performing arithmetic operations on an actual orifice opening coefficient $K_O$ by dividing the target transfer torque $T_M$ by the square of a detected rotational speed differential $\Delta N^2$, a K-$\theta$ table (orifice opening coefficient-orifice opening corresponding map) 234 for looking up an orifice opening $\theta_M$ corresponding to its own orifice opening coefficient K, a target orifice opening determining part 235 for determining a target orifice opening $\theta_M$ on the basis of an actual orifice opening coefficient $K_O$ obtained by the arithmetic operations by the actual orifice opening coefficient operating part 233 and of the K-$\theta$ table 234, and an output part 236 for supplying a control signal capable of attaining the target orifice opening $\theta_M$ to the motor 180.

The operation of the above-described comlunation will now be described hereinbelow.

(A) Preparation of K-$\theta$ Table

With the transfer torque control device 22, the transfer torque T varies in proportion to the square of the rotational speed differential $\Delta N^2$, and the proportion of the proportionality coefficient between them to the orifice opening $\theta$ is one to one.

The proportionility coefficient between the transfer torque T and the square of the rotational speed differential $\Delta N^2$ is thus defined as an orifice opening coefficient K, and the relation between the orifice opening $\theta$ and the orifice opening coefficient K is represented by a K-$\theta$ table.

Figures 5, 6:
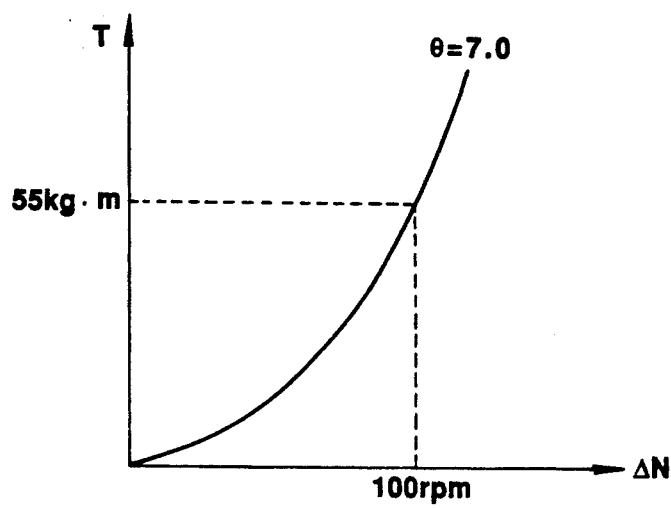
FIG. 5 is a graph of an example of a torque transfer characteristic for use in preparation of a K-$\theta$ table for the transfer torque control device of FIG. 2.
FIG. 6 is an example of a K-$\theta$ table for the transfer torque control device of FIG. 2.

In this instance, as shown in FIG. 5, when the rotational speed differential $\Delta N$ is 1000 rpm and the transfer torque T is 55 Kg.m, the orifice opening coefficient K is obtained from the following calculation.

$$K = \frac{T \times 10^5}{\Delta N^2} = 550$$

In this manner, an example of a K-$\theta$ table in FIG. 6 is prepared.

(B) Transfer Torque Control

Figure 8:
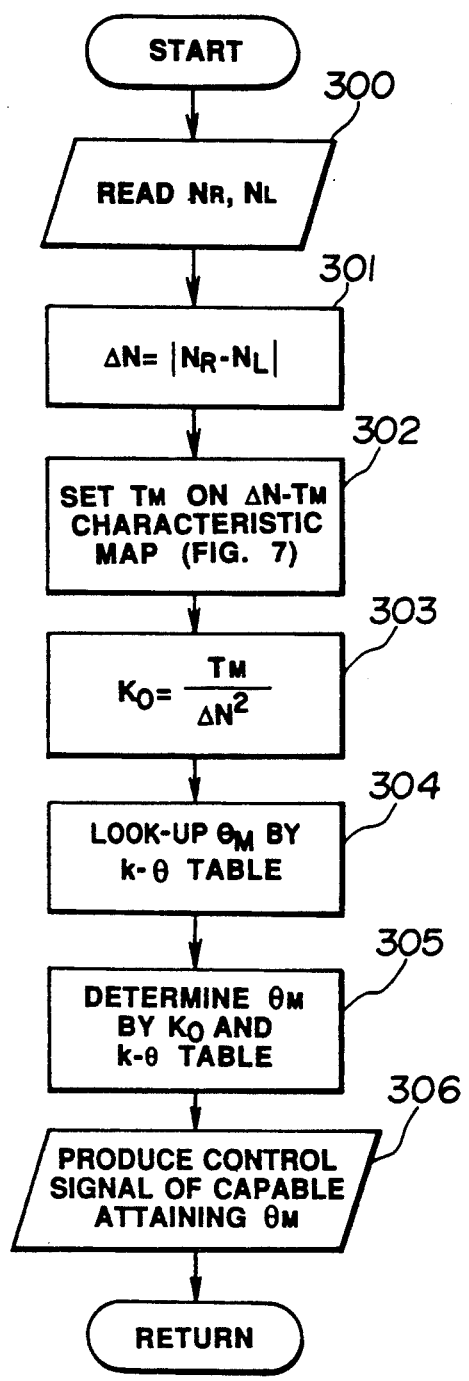
FIG. 8 is a flowchart of a transfer torque control performed by the transfer torque control device of FIG. 2.
Figure 11:
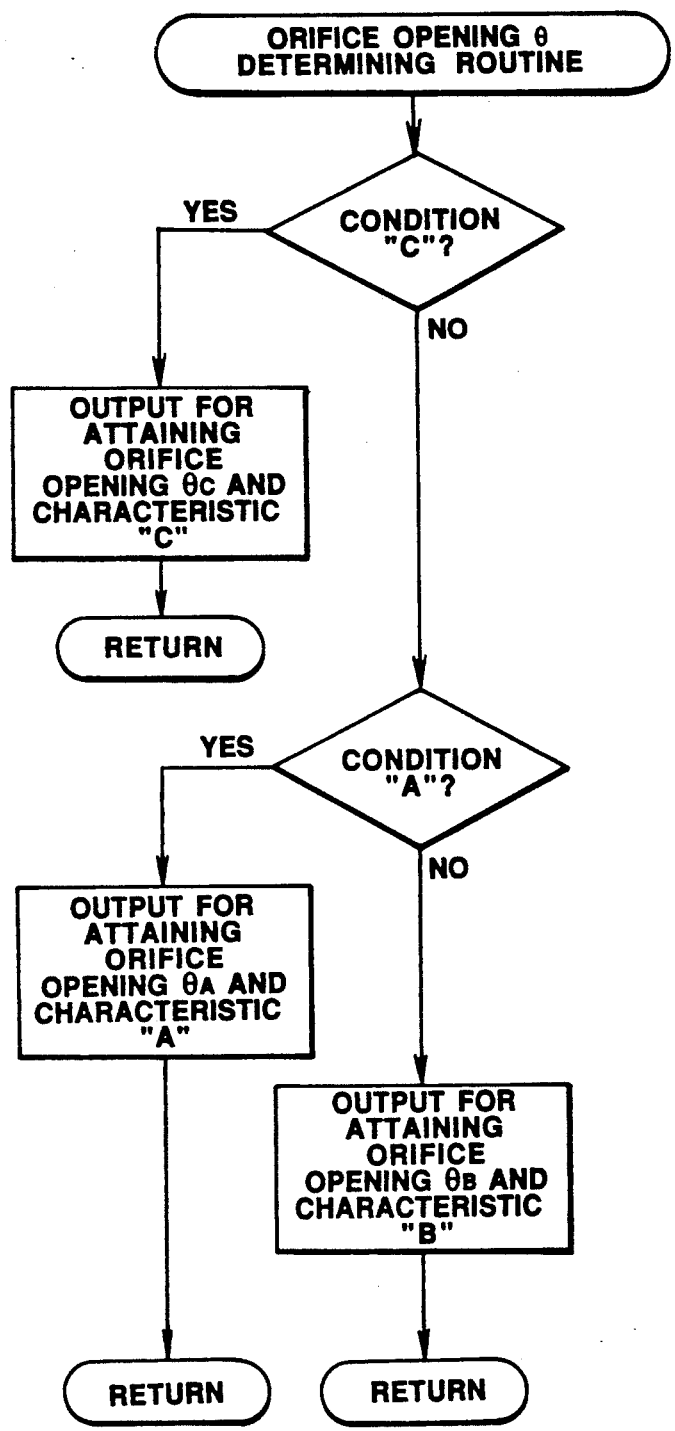
FIG. 11 is a flowchart of a prior art torque transfer differential control.

FIG. 8 shows a flowchart depicting a control performed by the control unit 230.

At step 300, the relative rotational speed differential operating part 232 reads signals $N_R$ and $N_L$ from the rotation sensors 210 and 220. At step 300, the operating part 232 performs arithmetic operations on the relative rotational speed differential $\Delta N$ on the basis of the signals $N_R$ and $N_L$. At step 302, the target transfer torque setting part 231 sets a target transfer torque $T_M$ on the basis of the rotational speed differential $\Delta N$ and the target torque transfer characteristic map shown in FIG. 7. At step 303, the actual orifice opening coefficient operating part 233 performs arithmetic operations on an actual orifice opening to develop a coefficient $K_O$ by dividing target transfer torque $T_M$ by the square of the detected rotational speed differential $\Delta N^2$. At step 304, the K-$\theta$ table 234 is used to look up a target orifice opening $\theta_M$ corresponding to its own orifice opening coefficient K. At step 305, the target orifice opening determining part 235 determines a target orifice opening $\theta_M$ on the basis of the actual orifice opening coefficient $K_O$ and the K-$\theta$ table 234. At step 306, the target orifice opening determining part 235 produces a control signal capable of attaining the target orifice opening $\theta_M$ and supplies it to the motor 180. o

(C) Operation During Cornering of a Vehicle

Figure 7:
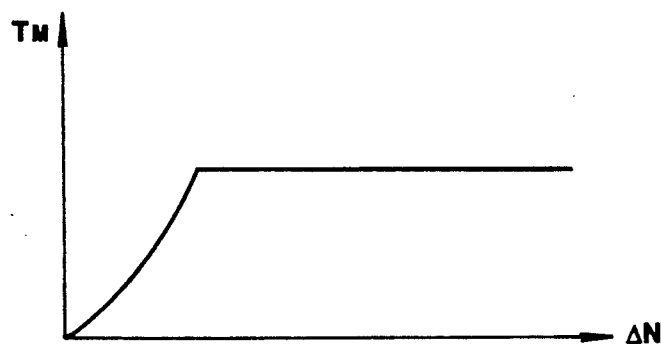
FIG. 7 is a graph of a target torque transfer characteristic map for the transfer torque control device of FIG. 2.
Figure 9:
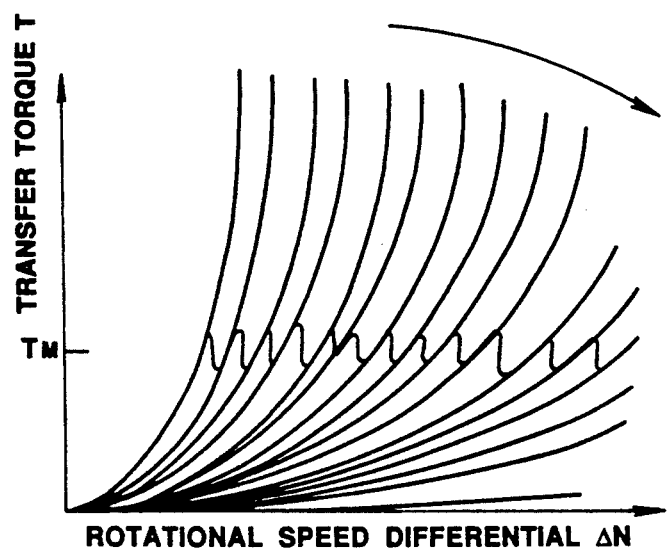
FIG. 9 is a graph depicting a sequential change of torque transfer characteristics which are performed by the transfer torque control device of FIG. 2 for attaining, during vehicle cornering, the target torque transfer characteristic of FIG. 7.
Figure 10:
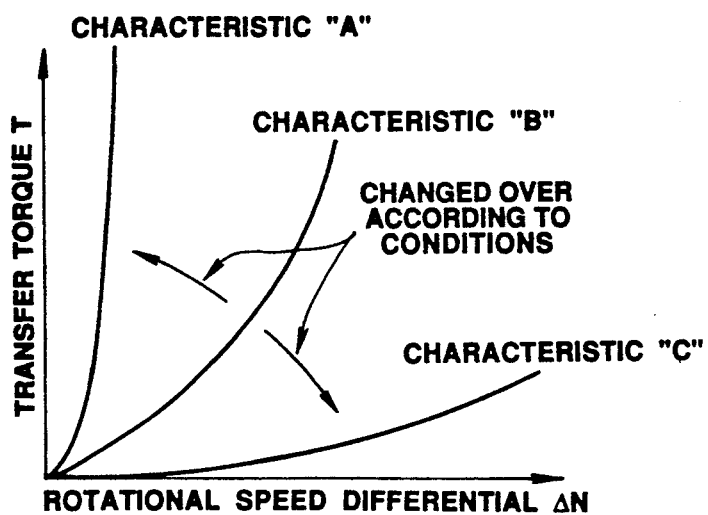
FIG. 10 is a graph of various preset torque transfer characteristics according to the prior art.

During cornering, as shown in FIG. 9, the orifice opening $\theta$ is reduced successively in order to attain the target torque transfer characteristic shown in FIG. 7. By this, when the rotational speed differential $\Delta N$ is smaller than a predetermined value, the orifice opening $\theta$ is kept fully closed to cause the transfer torque T to increase sharply for thereby limiting the differential slip and causing the vehicle to turn inside with a good responsiveness.

In the meantime, a rotational speed differential responsive type control coupling is generally required to have a good responsiveness since a rotational speed differential first occurs and thereafter a transfer torque is caused.

Further, as shown in FIG. 7, when the rotational speed differential $\Delta N$ increases beyond a predetermined value, the transfer torque T is maintained substantially at a constant value independently from a variation of the rotational speed differential $\Delta N$, thus making it possible to assuredly prevent otherwise possible spining of the vehicle due a sharp increase of the transfer torque.

In the foregoing, the target transfer torque $T_M$ may otherwise be determined on the basis of additional vehicle informations such as a vehicle speed, steering angle, throttle opening, etc.

From the foregoing, it will be understood that a rotational speed differential responsive type control coupling having a novel and improved transfer torque control device of this invention can attain not only an improved turning ability but an improved turning stability.

It will be further understood that the transfer torque control device 22 makes it possible to attain such a control in which a rotational speed differential between the left and right wheels is kept unchanged and adjacently at a constant value which is determined from the difference of the radii of the turning circles of the inside and outside wheels during cornering and the vehicle speed for thereby preventing the spining of the inside wheel during cornering of the vehicle.

It should be further understood that the transfer torque control device of this invention is adapted to effect an independent transfer torque control by obtaining a target orifice opening on the basis of an actual orifice opening coefficient, which is obtained from arithmetic operations on the basis of a target transfer torque and a detected rotational speed differential, and a preset orifice opening coefficient-orifice opening corresponding map, thus making it possible to maintain a transfer torque unchanged irrespective of a variation of a rotational speed differential or to maintain a rotational speed differential unchanged by changing a transfer torque, i.e., to increase freedom in control of a torque transfer characteristic of an associated control coupling.

While the present invention has been described and shown as being applied to a limited slip differential to serve as a differential slip limiting device, this is not for the purpose of limitation but it may be used as a driving force distributing device for a four-wheel drive.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:
1. A control coupling, comprising:
a first rotary member;
a second rotary member rotatable relative to said first rotary member;
hydraulic fluid discharge means responsive to a rotational speed differential between said first and second rotary members for discharging a quantity of hydraulic fluid proportional to said rotational speed differential;

means comprising an orifice for restricting a discharge of hydraulic fluid by said hydraulic fluid discharge means and for thereby producing a transfer torque between said first and second rotary members;

orifice opening changing means for changing an opening of said orifice when actuated;

actuator means for actuating said orifice opening changing means;

target transfer torque setting means for setting a target transfer torque to be transmitted between said first and second rotary members;

rotational speed differential detecting means for detecting a rotational speed differential between said first and second rotary members;

actual orifice opening coefficient operating means for performing arithmetic operations to determine an actual orifice opening coefficient by dividing said target transfer torque by the square of a rotational speed differential detected by said rotational speed differential detecting means;

target orifice opening determining means for determining a target orifice opening on the basis of said actual orifice opening coefficient obtained by said arithmetic operations by said actual orifice opening coefficient operating means; and output means for producing a control signal capable of generating said target orifice opening corresponding to an actuation of said actuator means.

2. A control coupling, comprising:

a first rotary member;

a second rotary member rotatable relative to said first rotary member;

hydraulic fluid discharge means responsive to a rotational speed differential between said first and second rotary members for discharging a quantity of hydraulic fluid proportional to said rotational speed differential;

orifice means for restricting discharge of hydraulic fluid by said oil discharge means to produce a transfer torque between said first and second rotary members;

orifice opening changing means for changing an opening of said orifice means in response to an orifice opening control signal supplied thereto; and control means for supplying said orifice opening control signal to said orifice opening changing means to control said opening of said orifice means in correspondence with variations of a rotational speed differential between said first and second rotary members to generate a desired torque transfer characteristic, wherein said control means includes first detecting means for detecting a rotational speed of said first rotary member and for producing a first rotational speed detecting signal representative thereof, second detecting means for detecting a rotational speed of said second rotary member and for producing a second rotational speed detecting signal representative thereof, rotational speed differential operating means for performing arithmetic operations to determine said rotational speed differential between said first and second rotary members from said first and second rotational speed detecting signals, target transfer torque setting means for setting a target transfer torque based on said rotational speed differential, actual orifice opening coefficient operating means for performing arithmetic operations on an actual orifice opening based on said target transfer torque set by said target transfer torque setting means and said rotational speed differential, map means for looking up an orifice opening corresponding to said actual orifice opening coefficient, target orifice opening determining means for determining a target orifice opening on the basis of said map means and said actual orifice opening coefficient, and output means for supplying said orifice opening control signal to generate said target orifice opening.

3. A control coupling according to claim 2, wherein:

said arithmetic operations by said actual orifice opening coefficient operating means for obtaining said actual orifice opening coefficient are performed by dividing said target transfer torque set by said target transfer torque setting means by the square of said rotational speed differential.

4. A control coupling according to claim 2, wherein:

said orifice opening changing means comprises an electrical motor actuated to rotate in response to said orifice opening control signal from said output means, said orifice means changing an orifice opening in proportion to rotation of said motor.

5. A control coupling according to claim 4, wherein:

said orifice opening changing means further comprises a valve spool axially moveable to change said opening of said orifice means, movable coaxial inner and outer sleeves provided on said first rotary member, a bearing interposed between said inner and outer sleeves to support them upon each other, a transverse rod extending through and transversely of said first rotary member to have opposite axial ends secured to said inner sleeve, and a lever operatively connected to said motor and said outer sleeve for converting a rotation of said motor into a corresponding axial movement of said outer sleeve.

* * * * *